US010250782B2

(12) United States Patent
Kang et al.

(10) Patent No.: US 10,250,782 B2
(45) Date of Patent: Apr. 2, 2019

(54) CAMERA MODULE, ELECTRONIC DEVICE, AND METHOD OF OPERATING THE SAME USING PRE-ESTIMATED LENS-CUSTOMIZED POINT SPREAD FUNCTION (PSF)

(71) Applicant: SAMSUNG ELECTRO-MECHANICS CO., LTD., Suwon-si (KR)

(72) Inventors: Myung Gu Kang, Suwon-si (KR); Young Kyun Lee, Suwon-si (KR); Yun Hee Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/195,649

(22) Filed: Jun. 28, 2016

(65) Prior Publication Data

US 2017/0104897 A1    Apr. 13, 2017

(30) Foreign Application Priority Data

Oct. 8, 2015 (KR) .................. 10-2015-0141442
Nov. 30, 2015 (KR) .................. 10-2015-0169253

(51) Int. Cl.
*H04N 5/217*   (2011.01)
*H04N 5/225*   (2006.01)

(52) U.S. Cl.
CPC .......... *H04N 5/217* (2013.01); *H04N 5/2257* (2013.01)

(58) Field of Classification Search
CPC ........ H04N 5/217; H04N 5/2257; G06T 7/11; G06T 7/38; G06T 5/003; G06T 2207/10024; G06T 2207/20021
USPC .......................................... 348/241
See application file for complete search history.

(56) References Cited

U.S. PATENT DOCUMENTS

| 2006/0013479 A1* | 1/2006 | Trimeche ............... H04N 9/045 382/167 |
| 2010/0188528 A1* | 7/2010 | Iwata ..................... H04N 5/772 348/231.99 |
| 2013/0132044 A1* | 5/2013 | Paris ..................... G02C 7/028 703/2 |
| 2013/0293761 A1* | 11/2013 | Guenter ............... H04N 17/002 348/345 |
| 2014/0160005 A1 | 6/2014 | Lee et al. |

FOREIGN PATENT DOCUMENTS

| KR | 10-2009-0041993 A | 4/2009 |
| KR | 10-2014-0076413 A | 6/2014 |

\* cited by examiner

*Primary Examiner* — Nhan T Tran
*Assistant Examiner* — Chan T Nguyen
(74) *Attorney, Agent, or Firm* — NSIP Law

(57) ABSTRACT

A camera module, an electronic device and a method of operating the same are provided. The camera module includes a lens module including lenses, and a sensor module including an image sensor configured to sense an image input through the lens module and a logic unit configured to process the image from the image sensor and the logic unit stores a lens-customized point spread function pre-estimated to correct blur characteristics of the lenses within the lens module.

23 Claims, 11 Drawing Sheets

IMAGE CHART (ICT)

LENS-CUSTOMIZED PSF (PSF-LC)

CAMERA MODULE, ELECTRONIC DEVICE, AND METHOD OF OPERATING THE SAME USING PRE-ESTIMATED LENS-CUSTOMIZED POINT SPREAD FUNCTION (PSF)

CROSS-REFERENCE TO RELATED APPLICATION(S)

This application claims the benefit under 35 USC 119(a) of Korean Patent Application Nos. 10-2015-0141442 and 10-2015-0169253 filed on Oct. 8, 2015 and Nov. 30, 2015, respectively, in the Korean Intellectual Property Office, the entire disclosure of which is incorporated herein by reference for all purposes.

BACKGROUND

1. Field

The following description relates to a camera module and an electronic device that use a lens-customized point spread function (PSF) pre-estimated to correct blur characteristics caused by hardware defects such as distortions of lenses within the camera module, an assembly error of the lenses, or the like, and a method of operating the same.

2. Description of Related Art

Many electronic devices such as a smartphone are equipped with a camera module. Due to the recent trend for miniaturizing electronic devices, camera modules mounted in these electronic devices are often required to have a compact size and high performance.

Images obtained by such a camera module may be blurry due to several reasons. The blurriness of images reduces the image resolution.

The reasons for the blurriness observed in images may be attributed to hardware defects such as distortions of the lenses that occur during the manufacturing process of the lenses, an assembly error caused during the mounting of the lenses, or the like.

In an existing method of producing camera modules, in order to improve an average blur generated in each camera, the image correction to remove the blurring may be performed in a processor of an electronic device using a point spread function (PSF) estimated as a representative value with respect to all camera modules manufactured by the same production process to have the same specification.

In the existing image correction method as described above, because a PSF estimated as the representative value is used with respect to a plurality of camera modules manufactured to have the same specification by the same production process, the correction removes only the average blur. However, because each lens have different blur characteristics due to several causes and a camera module includes a unique set of these lens, the method may not provide appropriate correction of images for blur characteristics of lenses within individual camera modules.

In addition, during the process of manufacturing the camera modules, camera modules may be screened such that a camera module with lenses with blur characteristics below a predetermined reference levels may be determined to be defective. When the lens thicknesses are reduced in order to produce thinner camera modules to meet the specification requirements for miniaturized electronic devices, a greater amount of blurring is generated in comparison to a camera module that includes thicker lenses. Thus, a defect rate may be increased with the reduction of lens thickness, reducing a manufacturing yield. Therefore, a method for improving image resolution and increasing production yield is desirable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including lenses, and a sensor module including an image sensor configured to sense an image input through the lens module and a logic unit configured to process the image from the image sensor, and the logic unit stores a lens-customized point spread function (PSF) pre-estimated to correct blur characteristics of the lenses within the lens module.

During a production process of the camera module, the lens-customized PSF may be estimated using a sample image that is obtained by photographing an image chart through the lens module and a reference image without blur that corresponds to the image chart.

The lens-customized PSF may be obtained using a sample image that is obtained by photographing an image chart through the lens module and a reference image without blur that corresponds to the image chart without blurring, and the lens-customized PSF may include a plurality of PSFs corresponding to a plurality of positions of the sample image.

The logic unit may store a correction algorithm that uses the lens-customized PSF to reduce blur in the image.

In another general aspect, an electronic device includes a camera module and a processor. The camera module includes a lens module comprising lenses and a sensor module. The sensor module includes an image sensor configured to sense an image input through the lens module and a logic unit configured to process the image sensed by the image sensor, the logic unit storing a lens-customized PSF pre-estimated in order to correct blur characteristics of the lenses within the lens module. The processor stores a correction algorithm that uses the lens-customized PSF provided from the logic unit to reduce blur in the image During a production process of the camera module, the lens-customized PSF may be estimated using a sample image that is obtained by photographing an image chart through the lens module and a reference image without blur that corresponds to the image chart.

The lens-customized PSF may include a plurality of PSFs each estimated for a plurality of positions of a sample image obtained by photographing an image chart through the lens module, and the lens-customized PSF may be estimated during a production process of the camera module using a pair of images including the sample image and a reference image without blur that corresponds to the image chart.

In another general aspect, a method of operating a camera module includes a lens module and a sensor module, and the method involves obtaining a pair of images including a sample image that is obtained by photographing an image chart through the lens module and a reference image without blur that corresponds to the image chart, separating the pair of images for each preset color channel to obtain a plurality of channel images, vertically and horizontally dividing each of the plurality of channel images into a plurality of sections to divide each of the plurality of channel images into a plurality of region images, setting region of interest (ROI)

image pairs for each of the plurality of region images, and performing image registration on each of the ROI image pairs, estimating a lens-customized PSF for correcting blur characteristics of lenses within the lens module of the camera module using the image-registered ROI image pairs, and storing the lens-customized PSF.

The general aspect of the method may further involve, before the storing of the lens-customized PSF, performing a post-processing operation to reduce a side effect resulting from reconstructing an image, and the storing of the lens-customized PSF may involve storing a lens-customized PSF obtained by the post-processing operation in the sensor module.

In the general aspect of the method, the obtaining of the pair of images, the separating of the pair of images, the vertical and horizontal dividing of each of the plurality of channel images, the setting of the ROI image pairs, the performing of the image registration, the estimating of the lens-customized PSF, and the storing of the lens-customized PSF may be performed during a production process of the camera module.

In another general aspect, a method of operating a camera module including a lens module and a sensor module involves: sensing, by the sensor module, an image input through the lens module to obtain an image; executing, by the sensor module, a correction algorithm that uses a lens-customized PSF pre-estimated to correct blur characteristics of lenses within the lens module; and obtaining an enhanced image through the executing of the correction algorithm that uses the lens-customized PSF.

During a production process of the camera module, the lens-customized PSF may be estimated using a sample image that is obtained by photographing an image chart through the lens module and a reference image without blur that corresponds to the image chart.

The lens-customized PSF may include a plurality of PSFs estimated for a plurality of positions of a sample image obtained by photographing an image chart through the lens module, using a pair of images including the sample image and a reference image without blur that corresponds to the image chart.

In another general aspect, a method of operating an electronic device including a camera module and a processor is provided, the camera module including a lens module and a sensor module, and the processor processing a signal from the camera module. The method involves sensing an image input through the lens module to obtain an image, providing the obtained image to the processor, executing, by the processor, a correction algorithm that uses a lens-customized PSF obtained from the camera module to correct for blur in the image, and obtaining an enhanced image through the executing of the correction algorithm that uses the lens-customized PSF.

During a production process of the camera module, the lens-customized PSF may be estimated using a sample image that is obtained by photographing an image chart through the lens module and a reference image without blur that corresponds to the image chart.

The lens-customized PSF may include a plurality of PSFs estimated for a plurality of positions of a sample image obtained by photographing an image chart through the lens module, using a pair of images including the sample image and a reference image without blur that corresponds to the image chart.

In another general aspect, a camera module that corrects for lens-module specific blur is provide. The camera module includes a lens module including lenses, and a memory storing a lens-customized point spread function for reducing blur in an image obtained by the lens module. The lens-customized point spread function is estimated by analyzing a sample image that is obtained by photographing an image chart with the lenses of the lens module.

The lens-customized point spread function may be estimated based on the sample image that is obtained by photographing the image chart and a reference image without blur that corresponds to the image chart.

In another general aspect, an electronic device operation method involves detecting an image via an image sensor that detects an electromagnetic radiation that passed through lenses of a lens module; and applying, by a processor, a lens-customized point spread function retrieved from a memory to the detected image to reduce blur in the detected image. The lens-customized point spread function is estimated for the lenses of the lens module prior to the detecting of the image and stored in the memory.

The lens-customized point spread function may be estimated using a sample image obtained by photographing an image chart through the lenses of the lens module and a reference image without blur corresponding to the image chart.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
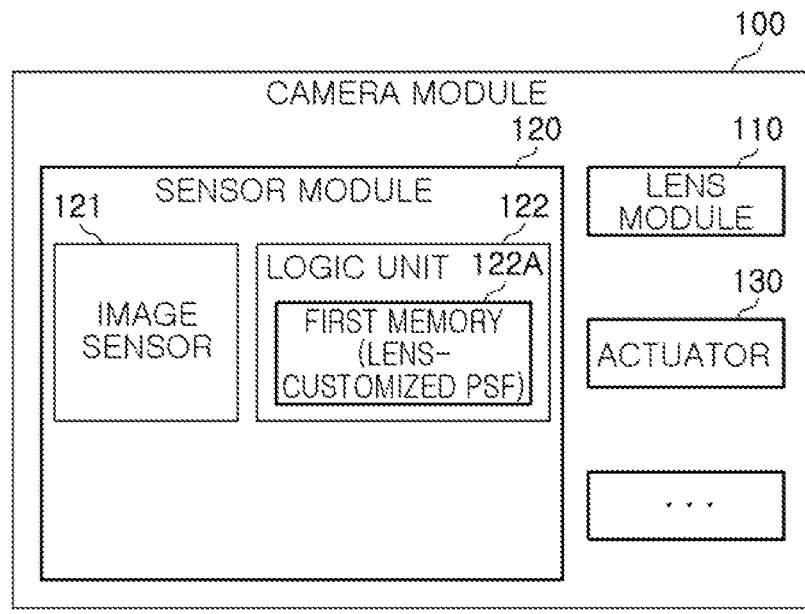
FIG. 1 is a diagram illustrating an example of a camera module according to the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the specification, it is to be understood that when an element, such as a layer, region or substrate, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, other elements or layers intervening therebetween cannot be present. Like numerals refer to like elements throughout. As used herein, the term "and/or" includes any and all combinations of one or more of the associated listed items.

Although terms such as "first," "second," and "third," may be used herein to describe various members, components, regions, layers and/or sections, these members, components, regions, layers, or sections are not to be limited by these terms. These terms are only used to distinguish one member, component, region, layer or section from another member, component, region, layer or section. Thus, a first member, component, region, layer or section discussed in examples below may also be referred to as a second member, component, region, layer or section without departing from the teachings of the examples.

Spatially relative terms such as "above," "upper," "below," and "lower" may be used herein for ease of description to describe one element's relationship to one or more other elements as shown in the figures. It is to be understood that the spatially relative terms are intended to encompass different orientations of the device in use or operation in addition to the orientation depicted in the figures. For example, if the device in the figures is turned over, elements described as being "above" another element or being an "upper" element will then be "below" the other element or will be a "lower" element. Thus, the term "above" can encompass both the above and below orientations depending on a particular direction of the figures. The device may also be oriented in other ways (for example, rotated 90 degrees or at other orientations) and the spatially relative descriptors used herein are to be interpreted accordingly.

The terminology used herein is for describing various examples only and is not to be used to limit the present disclosure. As used herein, the singular terms "a," "an," and "the" are intended to include the plural forms as well, unless the context clearly indicates otherwise. Further, as used herein, the terms "include," "comprises," and "have" specify the presence of stated features, numbers, operations, members, elements, and/or combinations thereof, but do not preclude the presence or addition of one or more other features, operations, members, elements, and/or combinations thereof.

Hereinafter, examples will be described with reference to schematic diagrams. In the drawings, due to manufacturing techniques and/or tolerances, for example, modifications of the shape shown may be estimated. Thus, the examples described herein are not to be construed as being limited to the particular shapes of regions shown herein, but are to be construed as including changes in shape that occur during manufacturing. The features of the examples described herein may be combined in various ways as will be apparent to one of ordinary skill in the art. Further, although the examples described below have a variety of configurations, other configurations are possible as will be apparent to one of ordinary skill in the art.

Figure 2:
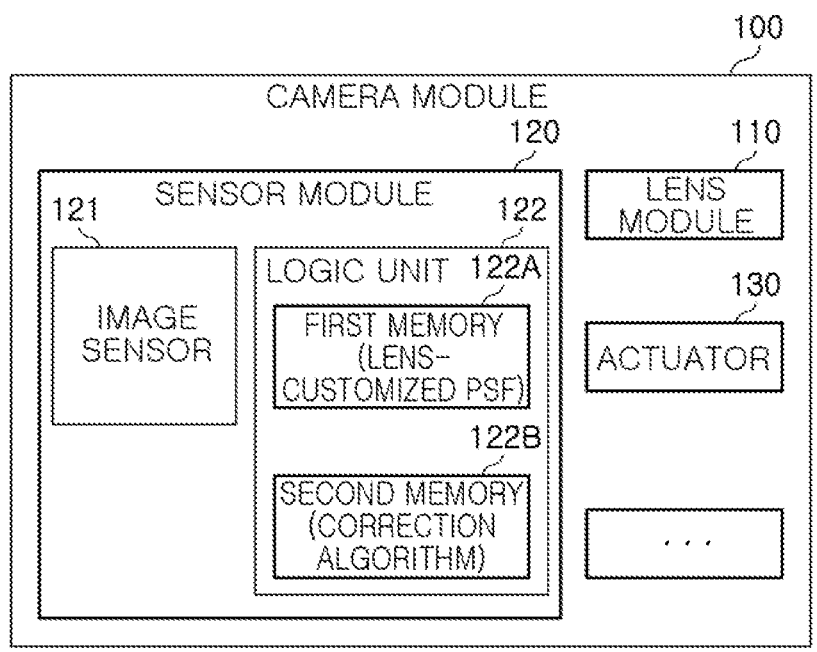
FIG. 2 is a diagram illustrating another example of a camera module according to the present disclosure.

FIG. 1 illustrates an example of a camera module, and FIG. 2 illustrates another example of a camera module.

Referring to FIGS. 1 and 2, the camera module 100 includes a lens module 110 and a sensor module 120.

In addition, the camera module 100 further includes an actuator 130.

The lens module 110 may include a plurality of lenses such as four lenses, seven lenses, or the like. There is no specific limit on the number of lenses.

The sensor module 120 includes an image sensor 121 and a logic unit 122.

The image sensor 121 may include an image sensor element such as a complementary metal-oxide semiconductor (CMOS), or the like, and may sense an image of a subject input through the lens module 110 and provide the sensed image to the logic unit 122.

The logic unit 122 may process the image obtained by the image sensor 121. Referring to FIGS. 1 and 2, the logic unit 122 includes a first memory 122A in which a lens-customized point spread function (PSF) (PSF-LC) pre-estimated in order to correct blur characteristics of the lenses within the lens module 110 is stored.

The lens-customized PSF (PSF-LC) is different from a general PSF that is applied as an average representative value for all camera modules having the same specification without considering the blur characteristics of the lenses in each lens module 110. The lens-customized PSF stored in the first memory 112A may be pre-estimated to optimally correct blur characteristics of individual lenses included in each camera module. The lens-customized PSF may be estimated, for example, by using a sample image X (blur image) that reflects the blur characteristics of the lenses included in a specific lens module 110 and a reference image Y without blur. The sample image X may be obtained by photographing an image chart (ICT) through the specific lens module 110, and the reference image Y may correspond to the image chart (ICT) without the blur resulting from photographing the image chart (ICT) with the lens module 110.

For example, the lens-customized PSF (PSF-LC) may include a plurality of lens-customized PSFs (PSF-LC) estimated for each position of the sample image X obtained by photographing the image chart (ICT) through the lens module 110, using a pair of images X and Y including the sample image X and the reference image Y without blur that corresponds to the image chart (ICT).

The lens-customized PSF (PSF-LC) may be estimated during a production process of the camera module.

Referring to FIGS. 1 and 2, the actuator 130 may adjust the positions of the lenses included in the lens module 110 under a control of the logic unit 122.

Referring to FIG. 2, the logic unit 122 of the camera module 100 includes the first memory 122A storing the lens-customized PSF (PSF-LC) therein, and a second memory 122B storing a correction algorithm for correcting a blur of an image from the image sensor 121. The correction algorithm may use the lens-customized PSF (PSF-LC) to correct the blur.

In this example, the correction algorithm may be a deblur algorithm capable of correcting a blur of an image.

In the examples illustrated in FIGS. 1 and 2, the first memory 122A is included in the logic unit 122 within the camera module 100. However, a position of the first memory 122A is not limited to a specific position within the camera module 100; in another example, the first memory 122A may be located in another location as long as the first memory 122A is used when the correction algorithm is executed. For example, the first memory 122A may be positioned in the lens module 110 or the sensor module 120 rather than being disposed in the logic unit 122, or may be disposed at any position within the camera module rather than being disposed in the lens module 110 or the sensor module 120.

The camera module 100 may perform the deblur algorithm to remove the blur in a photographed image by using the lens-customized PSF, thereby outputting an enhanced image.

Figure 3:
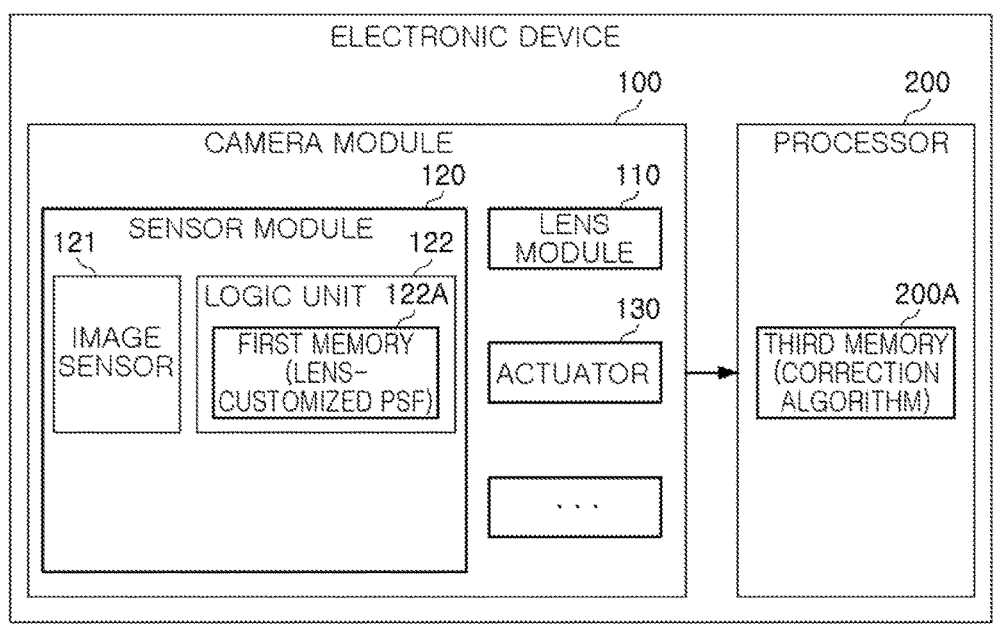
FIG. 3 is a diagram illustrating another example of an electronic device according to the present disclosure.

FIG. 3 illustrates another example of an electronic device according to the present disclosure.

Referring to FIG. 3, the electronic device includes a camera module 100 and a processor 200.

An overlapping description of the same contents described with reference to FIG. 1 among contents for the camera module 100 and the processor 200 illustrated in FIG. 3 will be omitted.

Referring to FIG. 3, a logic unit 122 includes a first memory 122A including a lens-customized PSF (PSF-LC) pre-estimated in order to correct the blur characteristics of lenses within a lens module 110.

The processor 200 includes a third memory 200A that stores a correction algorithm for correcting the blur of an image from the camera module 100 using the lens-customized PSF (PSF-LC) provided from the logic unit 122.

However, in another example, the first memory 122A, the second memory 122B, and the third memory 200A are not limited to having a specific configuration as long as they may store the lens-customized PSF and the correction algorithm therein.

For example, the processor 200 may include an image signal processor (ISP), and the ISP may include the correction algorithm and other algorithms. The other algorithms may include a deBayer algorithm, a color correction algorithm, a gamma correction algorithm, and the like.

When the correction algorithm is created in a code form that may be executed in the ISP, it may be operated in cooperation with other algorithms.

Referring to FIGS. 1 through 3, the camera module 100 according to each example includes a lens-customized PSF (PSF-LC). The lens-customized PSF (PSF-LC), which is pre-estimated and stored before a photographing operation of a camera, may be estimated and stored during the production process of the camera module 100, for example, in order to correct the blur characteristics of lenses within the respective camera modules 100.

The correction algorithm may be used to perform a blur correction on an image that includes blurriness that is characteristic of a lens module 110 using the lens-customized PSF (PSF-LC). Because the lens-customized PSF is pre-estimated in a lens-customized scheme based on the blur characteristics of the lenses within each camera module, by using the lens-customized PSF, the blur characteristics of the lenses within a camera module may be most appropriately corrected.

According to one example, the lens-customized PSF as described above is estimated during the production process of the camera module. Accordingly, the number of defect decisions of the lenses within the camera module may be reduced, and thus, a production yield may be increased.

Meanwhile, according to another example, the electronic device may be an electronic product that includes a camera module, such as a camera apparatus, a smartphone, a portable computer, or the like.

Conversely, the logic unit 122 and the processor 200 performing operations described in the present disclosure may be implemented by hardware components.

Examples of the hardware components may include controllers, generators, drivers, memories, Wi-Fi modules, and any other electronic component known to those skilled in the art. According to one example, the hardware components may be implemented by one or more processors or computers.

The processor or the computer may be implemented by one or more processing element such as an array of logic gates, a controller and an arithmetic logic unit, a digital signal processor, a microcomputer, a programmable logic controller, a field-programmable gate array, a programmable logic array, or a microprocessor, any another device, or a combination of devices obvious to those skilled in the art.

The processor or the computer may include one or more memories storing computer instructions or software executed by the processor or the computer therein, or may be connected to one or more memory.

The hardware components implemented by the processor or the computer may execute computer instructions or software such as an operating system (OS) and one or more software applications executed in the OS so as to perform operations described in the present disclosure.

In addition, the hardware components may manipulate, process, create, and store data in response to the execution of the computer instructions or the software.

In this example, the processor 200 may be, for example, an application processor of the electronic device, but is not limited thereto.

Figure 4:
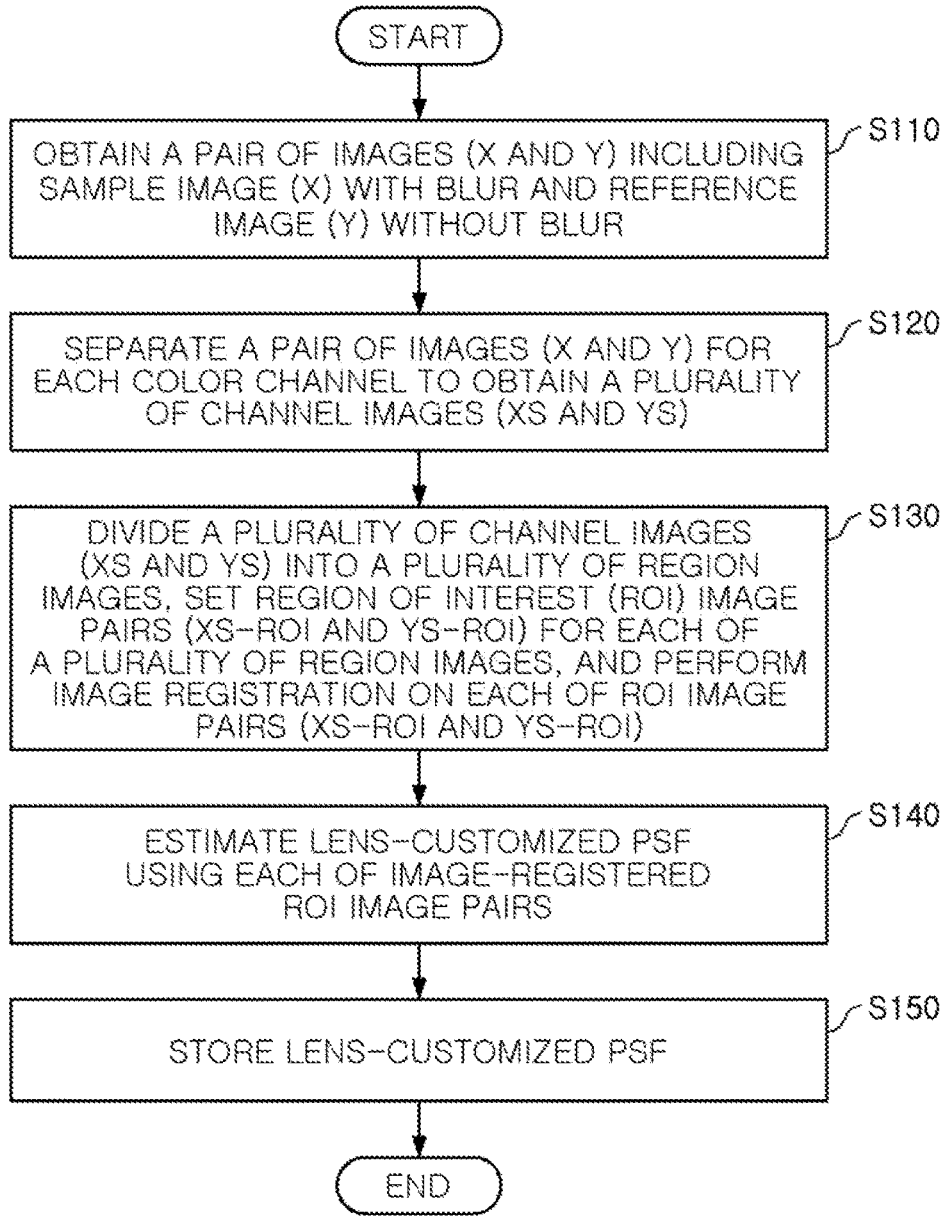
FIG. 4 is a flow chart illustrating an example of a method of operating a camera module to estimate a lens-customized point spread function (PSF).
Figure 5:
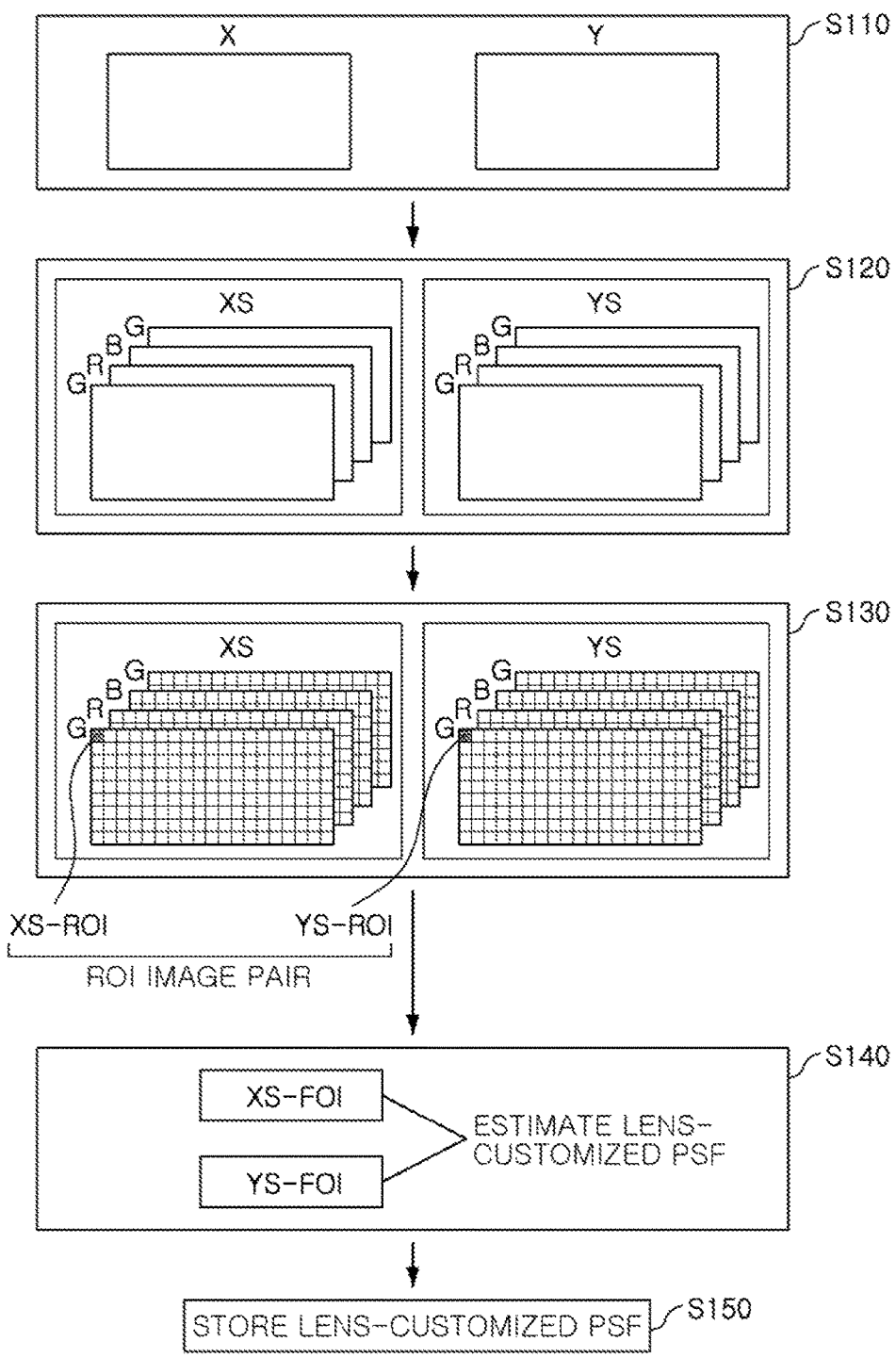
FIG. 5 is a diagram illustrating an example of a process of estimating the lens-customized PSF according to the flow chart illustrated in FIG. 4.

FIG. 4 is a flow chart illustrating an example of a method of operating a camera module to estimate a lens-customized PSF, and FIG. 5 is a diagram illustrating an example of a process of estimating the lens-customized PSF according to the flow chart illustrated in FIG. 4.

The description provided with reference to FIG. 2 applies to the example of the method of operating a camera module to estimate a lens-customized PSF as illustrated in FIGS. 4 and 5. Accordingly, an overlapping detailed description will be omitted.

Referring to FIGS. 2, 4, and 5, in S110, the camera module 100 obtains a pair of images X and Y including the sample image X with blur that is obtained by photographing the image chart (ICT) through the lens module 110 and the reference image Y without blur that corresponds to the image chart ICT.

In this example, the sample image X (or a target image) with blur that is photographed through the camera module 100 and the reference image Y without blur are used to estimate the lens-customized PSF (PSF-LC).

The sample image X, which is an image photographed through the camera module 100 in order to enhance the quality of images obtained by the camera module 100, includes blurriness reflecting the blur characteristics of the lens module 110. The sample image X may have been obtained by photographing the image chart corresponding to the reference image Y through the corresponding camera module 100. The image chart may be, for example, a random noise chart.

The reference image Y is an image that corresponds to the image chart ICT. The reference image Y does not include the blur. For example, the reference image Y may be a file image of the image chart (ICT), or may have been obtained by photographing the image chart through a camera module having excellent performance characteristics.

Because the pair of images X and Y are Bayer pattern raw data, a plurality of color channels may be mixed with each other in the pair of images X and Y. Therefore, as described below, the pair of images X and Y may be separated into a plurality of channel images XS and YS, respectively.

In S120, the camera module 100 separates the pair of images X and Y for each preset color channel to obtain the plurality of channel images XS and YS.

For example, each of the pair of images X and Y may be separated for each color channel to obtain the plurality of channel images XS and YS including images for each color channel. For example, in the event that a Bayer pattern is "GRBG", each of the pair of images X and Y may be separated for a total of four color channels, and thus a total of eight color channel images XS and YS including four images for the sample image X and four images for the reference image Y may be generated.

In S130, the camera module 100 vertically and horizontally divides each of the plurality of channel images XS and YS into a plurality of sections to divide each of the plurality of channel images XS and YS into a plurality of region images, sets region of interest (ROI) image pairs (XS-ROI and YS-ROI) for each of the plurality of region images, and performs image registration on each of the ROI image pairs (XS-ROI and YS-ROI).

For example, in the event that the Bayer pattern is "GRBG", each of the channel images XS and YS separated for each color channel such as G (Green), R (Red), B (Blue), and G (Green) may be horizontally and vertically divided into several sections to thereby be divided into a plurality of regions like a grid plate, and lens-customized PSFs (PSF-LC) may be estimated for each color channel with respect to each of the plurality of regions. Thus, lens-customized PSFs (PSF-LC) of each of G (Green), R (Red), B (Blue), and G (Green), that is, a total four of lens-customized PSFs (PSF-LC), may be estimated with respect to one region.

Next, the ROI image pairs (XS-ROI and YS-ROI) may be set for each of the plurality of region images, and the image registration may be performed on each of the ROI image pairs (XS-ROI and YS-ROI).

Herein, the image registration is defined as a process of allowing two images to coincide with each other when the two images overlap each other. Because the camera module is not always placed constantly at a predetermined position during an actual process of taking a photograph and lenses are not accurately coupled to each other, the sample image X and the reference image Y may not completely match each other. In such a case, it may be difficult to accurately estimate the PSF.

Therefore, in order to more accurately estimate the lens-customized PSF, grid pairs of the sample image X and the reference image Y may be matched to each other to allow the two images to coincide with each other.

In S140, the camera module 100 estimates the lens-customized PSF (PSF-LC) for correcting the blur characteristics of the lenses within the lens module 110 included in the camera module 100 using each of the image-registered ROI image pairs (XS-ROI and YS-ROI).

The lens-customized PSF (PSF-LC) for correcting the blur characteristics of the lenses within the camera module 100 may be estimated by, for example, Equation 1, using each of the image-registered ROI image pairs (XS-ROI and YS-ROI).

$$\text{Blur Image } (X) = \text{Lens-customized PSF} \\ (\text{PSF-LC})*\text{Reference Image } (Y) \quad \text{[Equation 1]}$$

In the above Equation 1, * represents a convolution. Because an inverse operation of the convolution is not actually present, one of several known PSF estimation algorithms such as performance of "Blur Image (X)/Reference Image (Y)" in a frequency domain, a use of a least squares method (LSM), or the like, may be used to estimate the lens-customized PSF (PSF-LC).

Then, in S150, the camera module 100 stores the lens-customized PSF (PSF-LC) in the first memory 122A.

In this example, a post-processing operation for reducing a side effect when an image is reconstructed may be performed before the lens-customized PSF (PSF-LC) is stored, and a lens-customized PSF (PSF-LC) obtained by the post-processing operation may be stored in the first memory 122 of the sensor module 120.

The post-processing operation, which is performed in order to reduce a side effect generated when the lens-customized PSF (PSF-LC) is used to reconstruct an image, may be an additional operation such as windowing or a weighted average.

Figure 6A:
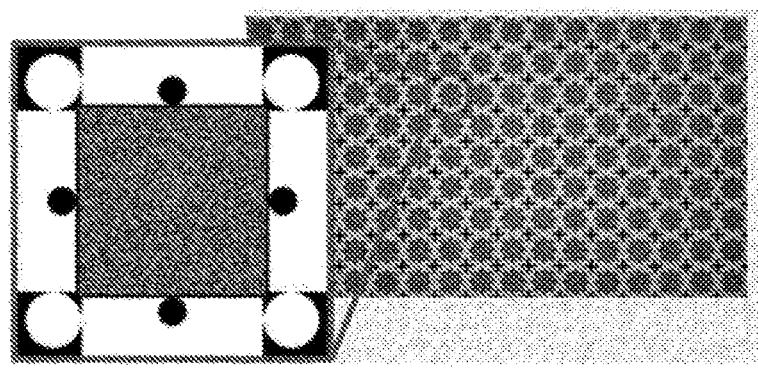
FIG. 6A illustrates an example of an image chart (ICT) used to estimate a lens-customized PSF.
Figure 6B:
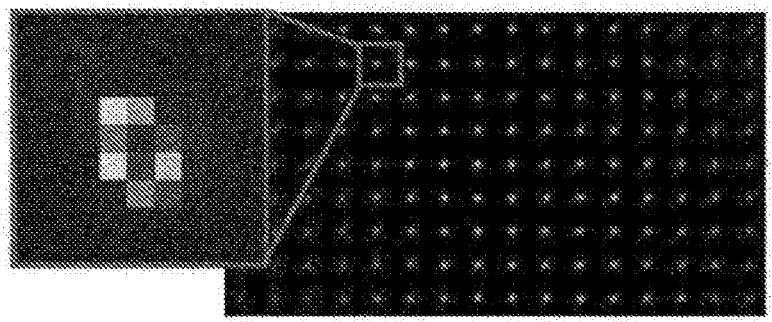
FIG. 6B illustrates an example of an image of the image chart (ICT) as viewed by an example of a set of lens-customized PSFs.

FIG. 6A illustrates an example of an image chart (ICT) used for estimating a lens-customized PSF, and FIG. 6B illustrates an example of an image viewed by a lens-customized PSFs estimated using the image chart (ICT).

Referring to FIG. 6A, a random noise chart having uniform characteristics over an entire frequency domain may be used as the image chart (ICT) to significantly reduce an estimation error.

For example, the image chart (ICT) illustrated in FIG. 6A is divided into grids of 16×9 (length×width), and each grid includes eight dots for image registration and noise parts.

An image chart (ICT) used in the methods described above does not need to have a fixed design as illustrated in FIG. 6A. In another example, the dots for the image registration may be added or omitted in the image chart. In addition, the number of grids or regions of random noise may also be modified.

Referring to FIG. 6B, an image viewed by a set of a plurality of lens-customized PSFs estimated using the image chart (ICT) of FIG. 6A is illustrated.

In the PSF image illustrated in FIG. 6B, an enlarged quadrangular PSF indicates a PSF for one grid region. In this example, the PSF consists of pixels of 9×9. When the Bayer pattern raw data is used as input data while the lens-customized PSF is being estimated, because PSFs are estimated for all channels, several sets of lens-customized PSFs may be present for each of the channels.

Meanwhile, in the event that lens-customized PSFs of all channels may not be estimated due to a limitation in storage space of a memory of the camera module, a method of converting an image after performing a deBayer algorithm to a YCbCr scheme to estimate the PSFs using only a Y channel may be used. In such an example, a set of PSFs may be present for only one Y channel. By applying the deBayer algorithm to the input data in advance, the PSFs may also be estimated by the same method.

As described above, the estimated lens-customized PSFs may be stored in an internal memory of the sensor module 120 or the processor 200. In one example, the values of the estimated lens-customized PSFs may be stored. In another example, the camera module may be modeled to extract specific coefficients representing the PSFs, and only the specific coefficients may be stored.

Figure 7:
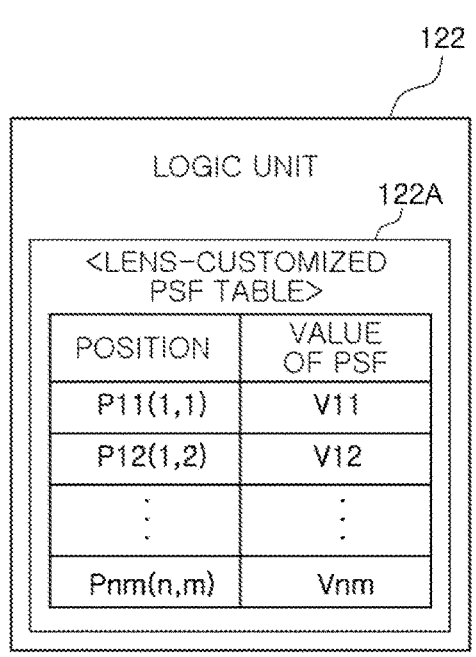
FIG. 7 is a diagram illustrating an example of a logic unit in a camera module according to the present disclosure.
Figure 8:
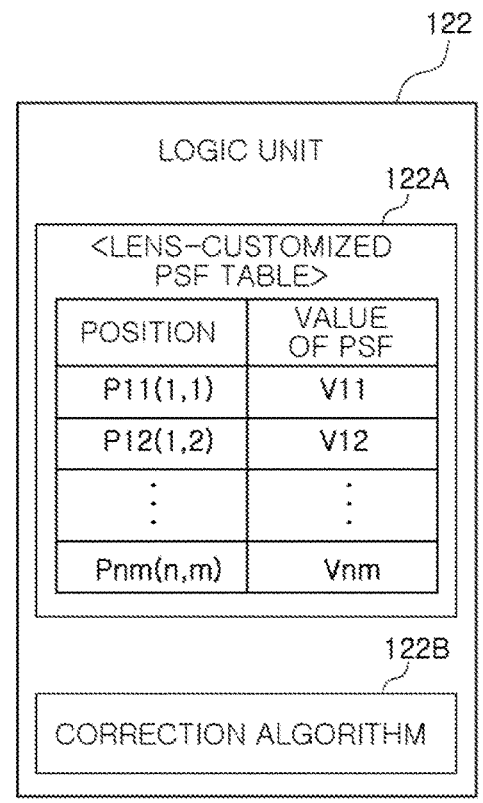
FIG. 8 is a diagram illustrating another example of a logic unit according to a camera module according to the present disclosure.

FIG. 7 illustrates an example of a logic unit according to the present disclosure, and FIG. 8 illustrates another example of a logic unit according to the present disclosure.

Referring to FIG. 7, the logic unit 122 includes the first memory 122A storing the lens-customized PSF (PSF-LC) therein.

Referring to FIG. 8, the logic unit 122 includes the first memory 122A storing the lens-customized PSF (PSF-LC) therein and the second memory 122B storing the correction algorithm therein.

As illustrated in FIGS. 7 and 8, the lens-customized PSF (PSF-LC) stored in the first memory 122A may be stored as a lens-customized PSF table.

In this example, when positions of pixels of an image with blur or the image sensor are P11, P12, . . . Pnm, V11, V12, . . . Vnm, which are values of lens-customized PSFs for each position P11(1,1), P12(1,2), . . . Pnm(n,m) of the pixels, may be mapped to P11, P12, . . . Pnm and stored in the lens-customized PSF table.

Therefore, when the correction algorithm is executed, correction may be performed using a corresponding lens-customized PSF (a corresponding value among V11, V12, . . . Vnm) for each of the positions P11, P12, . . . Pnm of the pixels of the image with blur or the image sensor.

Figure 9:
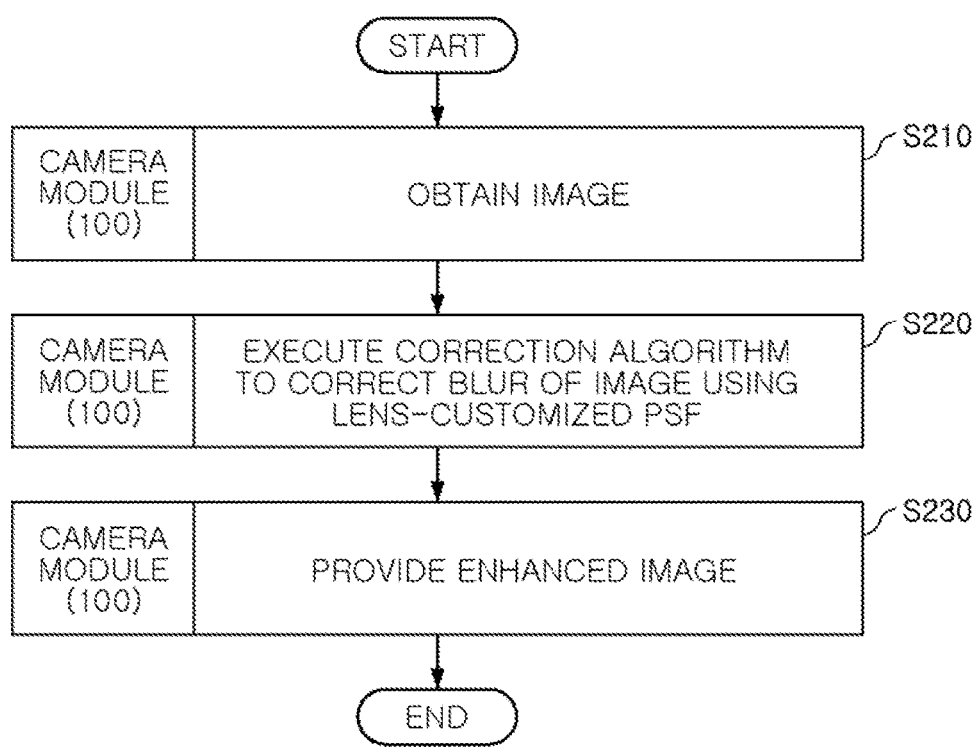
FIG. 9 is a flow chart illustrating another example of a method of operating a camera module.
Figure 10:
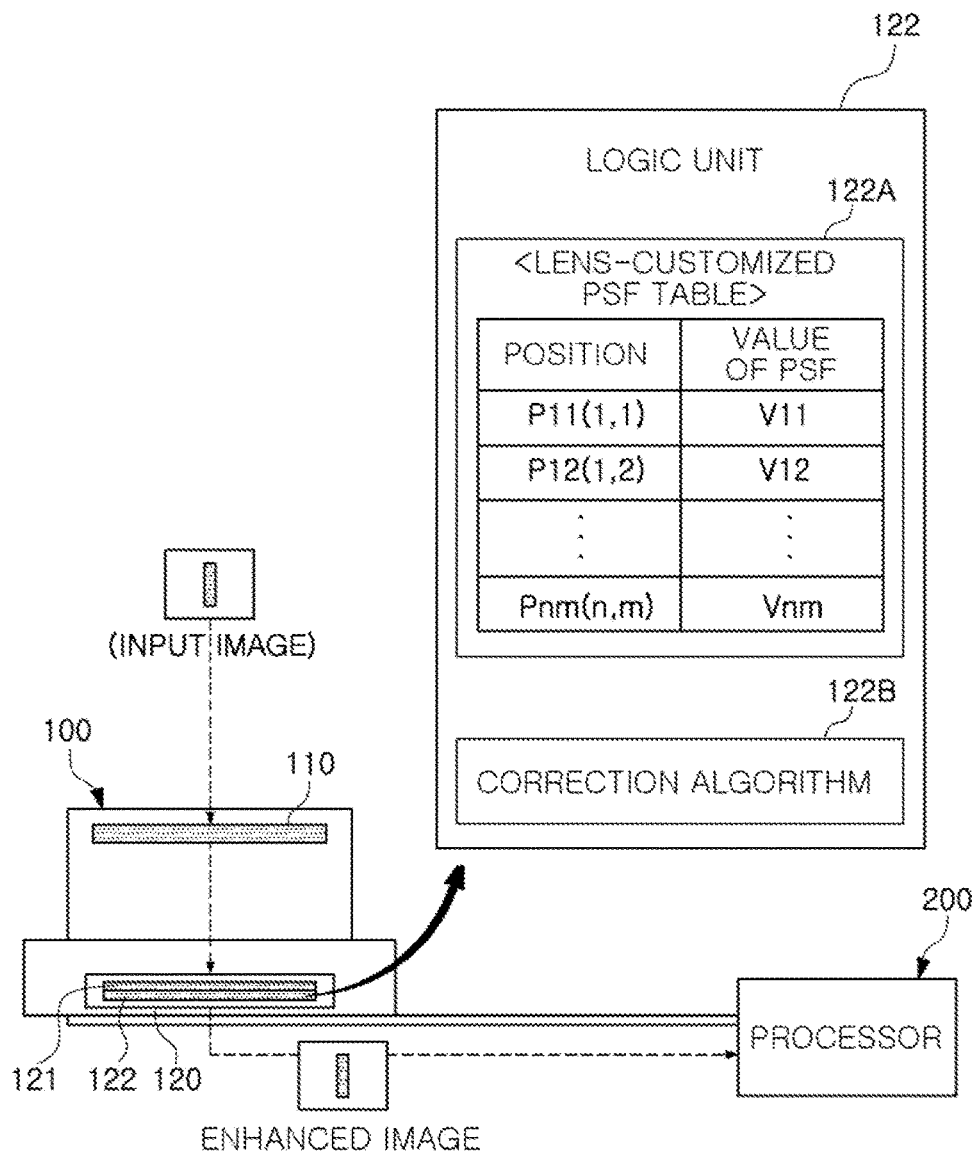
FIG. 10 is a diagram illustrating operation processes of an example of a camera module according to FIG. 9.

FIG. 9 is a flow chart illustrating another example of a method of operating a camera module according to the present disclosure, and FIG. 10 is a diagram illustrating operation processes of the camera module of FIG. 9.

Referring to FIGS. 2, 8, 9, and 10, in S210, the sensor module 120 of the camera module 100 obtains an image by sensing an image of a subject that is input through the lens module 110.

In S220, the sensor module 120 of the camera module 100 executes a correction algorithm for removing the blur from the image to enhance the image using the pre-estimated lens-customized PSF (PSF-LC), in order to correct for the blur characteristics of the lenses within the lens module 110.

Then, in S230, the sensor module 120 of the camera module 100 provides an enhanced image obtained through the correction using the lens-customized PSF (PSF-LC).

In this example, the lens-customized PSF may be stored in the first memory 122A of the logic unit 122 included in the sensor module 120, and the correction algorithm may be stored in the second memory 122B of the logic unit 122. When the logic unit 122 executes the correction algorithm of the second memory 122B, the correction algorithm may read the lens-customized PSF from the first memory 122A to perform image correction. Therefore, the input image may be reconstructed, and thus the enhanced image may be obtained.

An image output from the camera module 100, which is an image generated by correcting the input image by the correction algorithm, may have the same format as that of input data, and thus it may be processed in the processor 200 without performing additional processing.

As described above, the lens-customized PSF (PSF-LC) may be stored in the internal memory of the sensor module 120 of the camera module 100 or may be stored in the processor 200 disposed outside the camera module.

When the correction algorithm is executed, a pre-stored lens-customized PSF may be read and a correction process such as deconvolution, or the like, may be performed on the photographed input image, and thus an image clearer than the photographed image may be reconstructed and output.

The deconvolution may be used in this example as the correction algorithm, and any one of known deconvolutions for correction of the image may be used as the deconvolution. Examples of the known deconvolutions include a Wiener filter, a Richardson-Lucy method, an iteration method using a least squares method, and the like.

Figure 11:
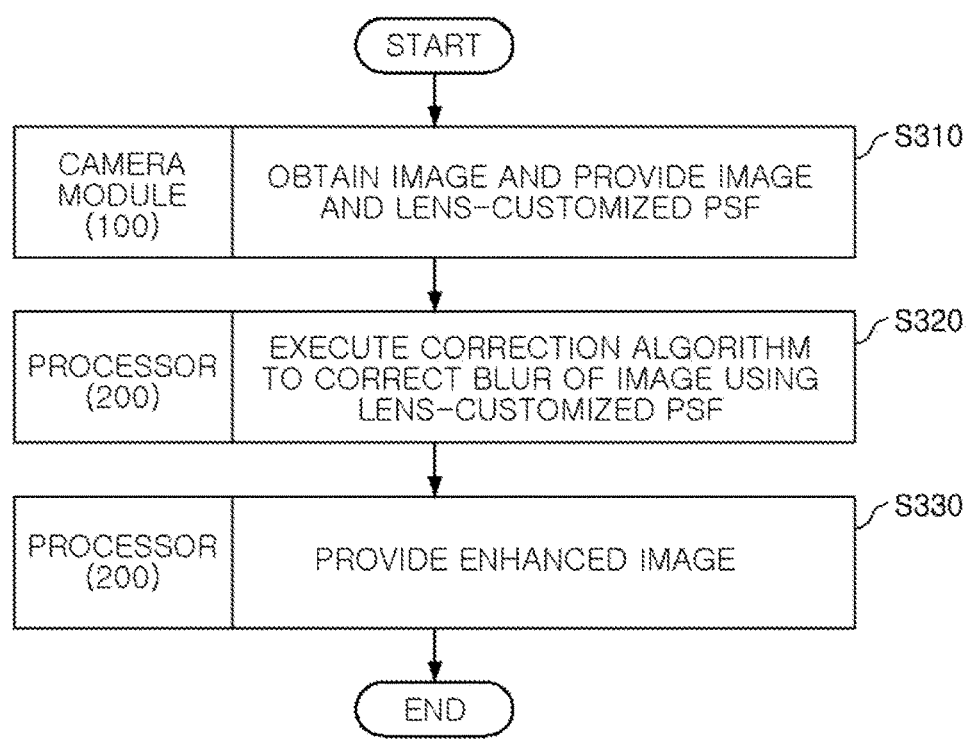
FIG. 11 is a flow chart illustrating another example of a method of operating an electronic device according to the present disclosure.
Figure 12:
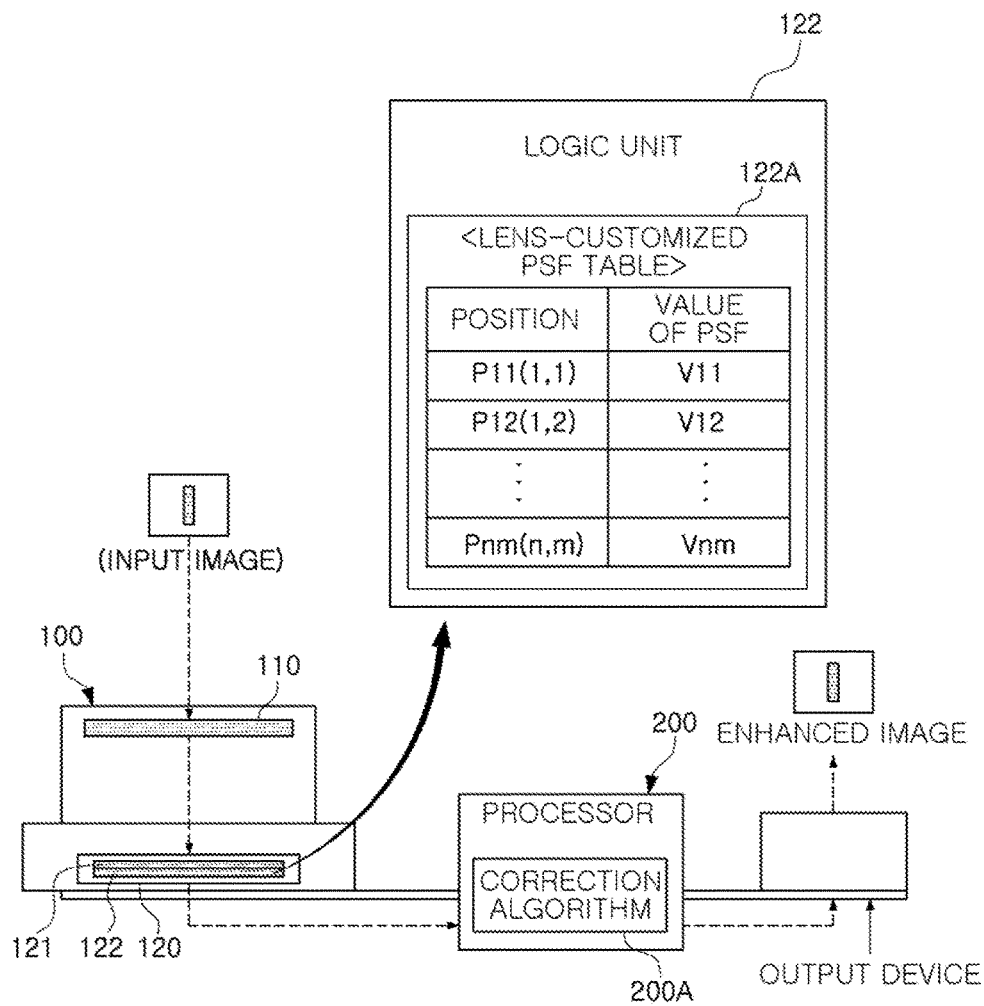
FIG. 12 is a diagram illustrating an operation process of the electronic device of FIG. 11.

FIG. 11 is a flow chart illustrating another example of a method of operating an electronic device according to the present disclosure, and FIG. 12 illustrates an example of an operation process of the electronic device shown in FIG. 11.

Referring to FIGS. 3, 7, 11, and 12, in S310, the camera module 100 obtains an image by sensing the image of a subject that is input through the lens module 110. The camera module 100 may provide the obtained image to the processor 200, and may provide the pre-estimated lens-customized PSF (PSF-LC) to the processor 200.

In S320, the processor 200 executes the correction algorithm stored in the third memory 200A to correct the blur of the image using the lens-customized PSF (PSF-LC) provided by the camera module 100.

For example, the image obtained through the camera module 100 may be transferred from the camera module 100 to the processor 200 without being reconstructed. In this example, when the correction algorithm is performed in the processor 200, the lens-customized PSF (PSF-LC) may be used by the correction algorithm, and the image may be corrected based on the execution of the correction algorithm, thereby enhancing the quality of the image.

Then, in S330, the enhanced image is provided through the correction using the lens-customized PSF (PSF-LC).

In one example, the electronic device may further include an output device. In this case, the image corrected in the processor 200 of the electronic device may be transferred to the output device. In this example, the corrected image may be further processed through another algorithm before being transferred to the output device.

Figure 13:
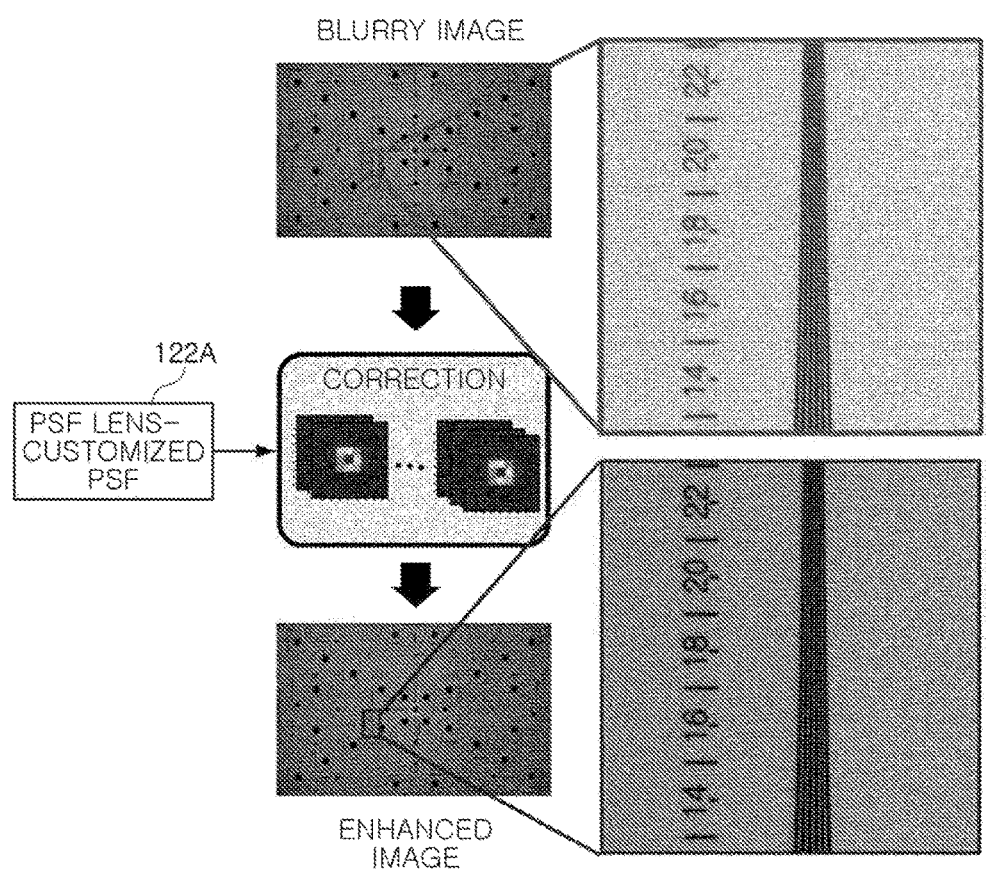
FIG. 13 is an illustrative view of an image including blur and an enhanced image obtained according to an example of the present disclosure.

FIG. 13 shows an image with blur and an enhanced image obtained according to an example of the present disclosure.

Referring to FIG. 13, a correction algorithm is executed as described above. In response to an image of a subject being input through the camera module 100, pixels may be separated for each channel, similar to the method of estimating the lens-customized PSF. Regions may be divided for each section, and a correction procedure may be performed using the lens-customized PSF for each corresponding region to correct the image, thus obtaining an enhanced image that is clearer than the original image.

According to one example described above, each camera module may store therein a lens-customized PSF pre-estimated during, for example, a production process of a camera module so as to correct the blur characteristics of the lenses within the specific camera module. Optimal image correction may be performed on an image obtained with the camera module based on the blur characteristics of the lenses within the corresponding camera module by using the lens-customized PSF. Therefore, the performance of the electronic device in which the camera module is mounted may be improved.

According to one example described above, the blur characteristics of the lenses included in the camera module may be optimally corrected by using a lens-customized PSF pre-estimated to correct the blur characteristics of the lenses within the camera module. Therefore, the performance of the electronic device in which the camera module is mounted may be improved.

The apparatuses, units, modules, sensors, actuators, devices, and other components illustrated in FIGS. 1-3 that perform the operations described herein with respect to FIGS. 4, 5, 9, and 11 may be implemented by hardware components. Examples of hardware components include controllers, sensors, generators, drivers, memories, Wi-Fi modules, comparators, arithmetic logic units, adders, subtractors, multipliers, dividers, integrators, microprocessor, and other components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer.

For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module comprising lenses; and
   a sensor module comprising an image sensor configured to sense an image input through the lens module, and a logic unit configured to process the image sensed by the image sensor,
   wherein the logic unit stores a lens-customized point spread function (PSF) pre-estimated to correct blur characteristics of the lenses within the lens module, and
   during a production process of the camera module, the lens-customized PSF is estimated using a sample image that is obtained by photographing an image chart through the lens module and a reference image, without blur, that is obtained independent of the lens module and that corresponds to the image chart.

2. The camera module of claim 1, wherein the lens-customized PSF comprises a plurality of PSFs respectively corresponding to a plurality of positions in the sample image.

3. The camera module of claim 1, wherein the logic unit further stores a correction algorithm that uses the lens-customized PSF to reduce blur in the image sensed by the image sensor.

4. The camera module of claim 1, wherein the reference image without blur is obtained by photographing the image chart through another lens module having better performance characteristics than the lens module.

5. The camera module of claim 1, wherein the reference image is pre-stored and corresponds to the image chart without blurring.

6. The camera module of claim 1, wherein the lens-customized PSF comprises a lens-customized PSF obtained by performing a post-processing operation to reduce a side effect resulting from reconstructing an image.

7. An electronic device comprising:
   a camera module; and
   a processor,
   wherein the camera module comprises:
      a lens module comprising lenses; and
      a sensor module comprising an image sensor configured to sense an image input through the lens module, and a logic unit configured to process the image sensed by the image sensor,
   the logic unit stores a lens-customized point spread function (PSF) pre-estimated in order to correct blur characteristics of the lenses within the lens module,
   the processor stores a correction algorithm that uses the lens-customized PSF provided from the logic unit to reduce blur in the image sensed by the image sensor, and
   during a production process of the camera module, the lens-customized PSF is estimated using a sample image that is obtained by photographing an image chart through the lens module and a reference image, without blur, that is obtained independent of the lens module and that corresponds to the image chart.

8. The electronic device of claim 7, wherein the lens-customized PSF comprises a plurality of PSFs respectively estimated for a plurality of positions in the sample image.

9. The electronic device of claim 7, wherein the reference image without blur is obtained by photographing the image chart through another lens module having better performance characteristics than the lens module.

10. A method of operating a camera module comprising a lens module and a sensor module, the method comprising:
obtaining a pair of images comprising a sample image that is obtained by photographing an image chart through the lens module, and a reference image, without blur, that is obtained independent of the lens module and that corresponds to the image chart;
separating the pair of images to obtain a plurality of channel images for preset color channels;
vertically and horizontally dividing each of the plurality of channel images into a plurality of sections to divide each of the plurality of channel images into a plurality of region images,
setting region of interest (ROI) image pairs for each of the plurality of region images,
performing image registration on each of the ROI image pairs;
estimating a lens-customized point spread function (PSF) for correcting blur characteristics of lenses within the lens module of the camera module using the image-registered ROI image pairs; and
storing the lens-customized PSF.

11. The method of claim 10, further comprising, before the storing of the lens-customized PSF, performing a post-processing operation to reduce a side effect resulting from reconstructing an image,
wherein the storing of the lens-customized PSF comprises storing a lens-customized PSF obtained by the post-processing operation in the sensor module.

12. The method of claim 10, wherein the obtaining of the pair of images, the separating of the pair of images, the vertically and horizontally dividing of each of the plurality of channel images, the setting of the ROI image pairs, the performing of the image registration, the estimating of the lens-customized PSF, and the storing of the lens-customized PSF are performed during a production process of the camera module.

13. The method of operating a camera module of claim 10, wherein the reference image without blur is obtained by photographing the image chart through another lens module having better performance characteristics than the lens module.

14. A method of operating a camera module comprising a lens module and a sensor module, the method comprising:
sensing, by the sensor module, an image input through the lens module to obtain an image;
executing, by the sensor module, a correction algorithm that uses a lens-customized point spread function (PSF) pre-estimated to correct the image obtained by the sensor module for blur characteristics of lenses within the lens module; and
obtaining an enhanced image through the executing of the correction algorithm that uses the lens-customized PSF,
wherein, during a production process of the camera module, the lens-customized PSF is estimated using a sample image that is obtained by photographing an image chart through the lens module and a reference image, without blur, that is obtained independent of the lens module and that corresponds to the image chart.

15. The method of claim 14, wherein the lens-customized PSF comprises a plurality of PSFs estimated for a plurality of positions in the sample image.

16. The method of operating a camera module of claim 14, wherein the reference image without blur is obtained by photographing the image chart through another lens module having better performance characteristics than the lens module.

17. A method of operating an electronic device comprising a camera module and a processor, the camera module comprising a lens module and a sensor module, the processor being configured to process information obtained from the camera module, the method comprising:
sensing, with the sensor module, an image input through the lens module to obtain an image;
providing the image obtained by the sensor module to the processor;
executing, by the processor, a correction algorithm that uses a lens-customized point spread function (PSF) obtained from the camera module to correct the image obtained by the sensor module for blur in the image; and
obtaining an enhanced image through the executing of the correction algorithm that uses the lens-customized PSF,
wherein, during a production process of the camera module, the lens-customized PSF is estimated using a sample image that is obtained by photographing an image chart through the lens module and a reference image, without blur, that is obtained independent of the lens module and that corresponds to the image chart.

18. The method of claim 17, wherein the lens-customized PSF comprises a plurality of PSFs estimated for a plurality of positions in the sample image.

19. The method of operating an electronic device operation of claim 17, wherein the reference image without blur is obtained by photographing the image chart through another lens module having better performance characteristics than the lens module.

20. A camera module that corrects for lens-module specific blur, the camera module comprising:
a lens module comprising lenses; and
a memory storing a lens-customized point spread function for reducing blur in an image obtained using the lens module,
wherein the lens-customized point spread function is estimated using a sample image that is obtained by photographing an image chart through the lens module and a reference image, without blur, that is obtained independent of the lens module and that corresponds to the image chart.

21. The camera module of claim 20, wherein the reference image without blur is obtained by photographing the image chart through another lens module having better performance characteristics than the lens module.

22. An electronic device operation method, the method comprising:
detecting an image using an image sensor configured to detect electromagnetic radiation that has passed through lenses of a lens module; and
applying, by a processor, a lens-customized point spread function retrieved from a memory to the detected image to reduce blur in the detected image,
wherein the lens-customized point spread function is estimated for the lenses of the lens module and stored in the memory prior to the detecting of the image, the lens-customized point spread function is estimated using a sample image obtained by photographing an image chart through the lenses of the lens module and a reference image, without blur, that is obtained independent of the lens module and corresponding to the image chart.

23. The electronic device operation method of claim 22, wherein the reference image without blur is obtained by photographing the image chart through another lens module having better performance characteristics than the lens module.

* * * * *